US008459507B1

(12) United States Patent
Cascio

(10) Patent No.: US 8,459,507 B1
(45) Date of Patent: Jun. 11, 2013

(54) DEVICE FOR DISPENSING HOT MILK

(75) Inventor: Vincent E. Cascio, Glen Ellyn, IL (US)

(73) Assignee: Gourmet Dispensing, Inc., Glen Ellyn, IL (US)

(*) Notice: Subject to any disclaimer, the term of this patent is extended or adjusted under 35 U.S.C. 154(b) by 29 days.

(21) Appl. No.: 13/363,560

(22) Filed: Feb. 1, 2012

(51) Int. Cl.

| | |
|---|---|
| *B67D 7/80* | (2010.01) |
| *B65D 88/54* | (2006.01) |
| *G01F 11/00* | (2006.01) |
| *F28F 3/00* | (2006.01) |
| *F28D 7/00* | (2006.01) |
| *A47J 31/00* | (2006.01) |
| *F24H 1/10* | (2006.01) |
| *F24H 1/08* | (2006.01) |
| *F24H 1/20* | (2006.01) |
| *H05B 3/78* | (2006.01) |

(52) U.S. Cl.
USPC ........ 222/146.2; 222/334; 392/496; 392/465; 392/471; 392/456; 392/447; 165/166

(58) Field of Classification Search
USPC ....... 222/146.2, 136, 334, 608; 165/164–167, 165/104.11, 104.28; 392/322, 314, 465, 496, 392/441, 456, 447, 471
See application file for complete search history.

(56) References Cited

U.S. PATENT DOCUMENTS 1,939,906 A 12/1933 Lichterman
2,748,249 A * 5/1956 Collerati ....................... 392/496
3,640,433 A 2/1972 Rodth
3,888,303 A * 6/1975 Skala ............................ 165/300
4,076,349 A * 2/1978 Gettleman et al. ............ 312/236
4,211,342 A 7/1980 Jamgochian et al.
4,327,802 A * 5/1982 Beldam ......................... 165/153
4,494,600 A 1/1985 DeLau
4,653,581 A * 3/1987 Yogo et al. .................... 165/166
4,921,143 A 5/1990 Billet
4,974,500 A * 12/1990 Boyd et al. ...................... 99/279
5,190,025 A * 3/1993 Chen ............................ 126/19.5
5,199,609 A 4/1993 Ash, Jr.
5,385,275 A 1/1995 Billet
5,411,179 A 5/1995 Oyler et al.
5,626,353 A * 5/1997 Campbell .................. 280/47.35
5,970,732 A 10/1999 Menin et al.
6,173,458 B1 * 1/2001 Maddux ............................ 4/626
6,820,763 B2 11/2004 Bilskie et al.
6,889,600 B2 * 5/2005 Rava ............................ 99/323.3
6,996,336 B1 2/2006 Mahoney et al.
2004/0237564 A1 12/2004 Zevlakis
2008/0156466 A1 * 7/2008 Schmelz ....................... 165/141
2009/0173099 A1 * 7/2009 Gumennyy ..................... 62/389
2010/0018402 A1 * 1/2010 Liu ................................ 99/281

* cited by examiner

*Primary Examiner* — Paul R Durand
*Assistant Examiner* — Benjamin R Shaw
(74) *Attorney, Agent, or Firm* — Marshall, Gerstein & Borun LLP

(57) ABSTRACT

A heated beverage, such as hot chocolate milk is dispensed by providing a refrigerated insulated cabinet having a plurality of beverage storage bags therein for storing refrigerated chocolate milk. Compressed $CO_2$ draws the milk through a pump and pushes it through a flat plate heat exchanger and out to a spigot. The $CO_2$ regulates the flow rate of the milk being dispensed. A heat exchange fluid, e.g., glycol is heated by a heating element and circulated through the flat plate heat exchanger to heat the milk as it passes through the flat plate heat exchanger. A thermostat maintains the heat exchange fluid and heated beverage at a desired temperature.

20 Claims, 6 Drawing Sheets

DEVICE FOR DISPENSING HOT MILK

FIELD OF THE INVENTION

The present invention relates to dispensing devices and in particular to a device for dispensing hot beverages, particularly hot chocolate milk, hot apple cider or heated alcoholic beverages, such as heated, spiced wine, through a dispensing system that dispenses the heated beverage at high volumes without temperature loss. In a preferred embodiment, the dispensing device is portable, and capable of easy movement from one location to another—a particularly useful feature for sporting event venues. In a preferred embodiment, the portable hot liquid dispensing device of the instant invention is used to convert a draft beer dispensing system to a hot chocolate milk dispensing system.

BACKGROUND AND PRIOR ART

Pressurized dispensing devices are commonly used for dispensing beverages such as water, beer, soft drinks, and hot chocolate. Fast food restaurants, cafeterias, and concessions often provide a tank for retaining cold milk and dispensing the cold milk by gravity flow through a spigot opening in the bottom of the tank, however, there presently is no commercial apparatus suitable for dispensing hot chocolate milk.

One attempt at providing a dispensing device for hot chocolate is described in Rava, U.S. Pat. No. 6,889,600 B2, wherein a heating coil containing the chocolate flavored water is immersed in a heated liquid. The heating coil requires a very large volume of surrounding heated liquid to bring the chocolate flavored water up to proper temperature (e.g., about 165° F.) and, therefore, is not suitable for a portable hot liquid dispensing device. Further, during the experimental phases of the present invention, it has been found that coil heaters tend to scorch the milk, corrode, and are difficult to clean resulting in hot milk having a scorched taste, and having an inconsistent, non-uniform temperature. The Rava '600 patented device was not commercially useful and the patent has already expired by non-payment of maintenance fees.

The audiences attending various sporting events and the like during the warmer months of the year, seek refreshments in the form of cold liquid, such as soft drinks and beer, but audiences attending outdoor events during the colder months, as occurs during the football season or other events where it is cold outside desire that the liquid refreshments be warm or hot. It is common to provide hot chocolate or coffee at such events, but the hot chocolate is in the form of chocolate and sugar dissolved in water and has very little body or flavor, and does not blend well or stay blended. Hot chocolate milk would be a far more desirable product, but presently there is no device available for heating and dispensing hot chocolate milk through a dispensing system of the type that is needed to service customers at such events.

SUMMARY OF THE INVENTION

Briefly, the present invention is directed to a device for heating and dispensing hot beverages, such as hot chocolate milk and includes a portable cabinet containing a refrigerated section and a heating section disposed adjacent and insulated or separated from the refrigerated section. Within the container is a flat plate heat exchanger for maintaining a uniform, consistent temperature of the milk, or other beverages, without scorching. In the only working embodiment, the heat exchanger is a plurality of flat plates (flat plate heat exchanger) capable of maintaining a beverage at a constant delivery temperature at a serving rate of at least six 14 oz. servings of hot chocolate milk per minute, per spigot.

BRIEF DESCRIPTION OF THE DRAWINGS

A better understanding of the present invention will be had after a reading of the following detailed description taken in conjunction with the drawings wherein.

DETAILED DESCRIPTION

Figure 1:
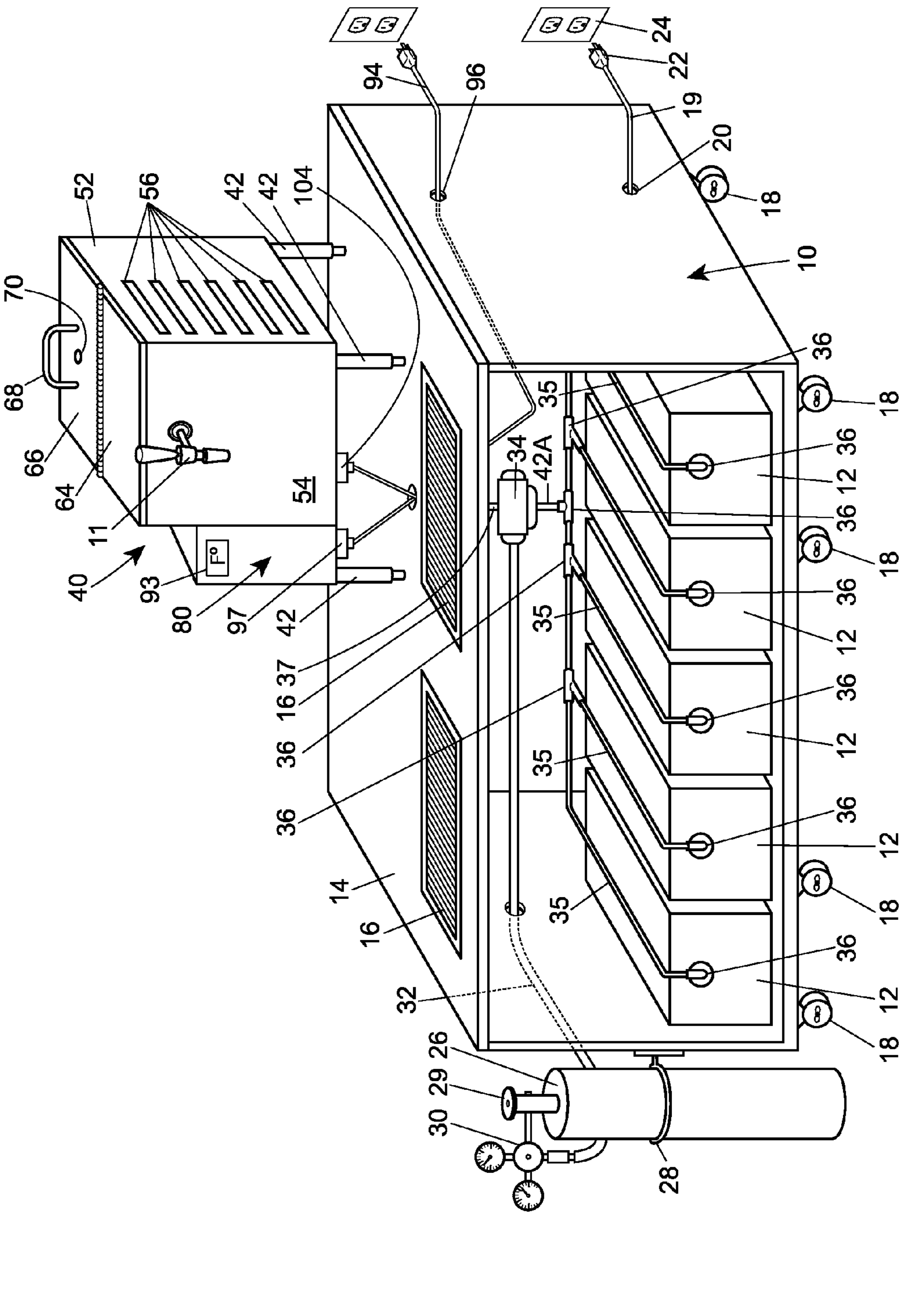
FIG. 1 is an isometric view of a dispensing device for dispensing hot chocolate milk with the elements of the device visible.

Referring to FIG. 1, a refrigerated cabinet 10 is generally of the type used to dispense liquid refreshments, such as cold beer or soft drinks at sporting events or the like. It has been found that a refrigerated cabinet 10 of the type manufactured to dispense cold liquid refreshments, such as beer or soft drinks, is particularly well suited for refrigerating cold milk since such cabinets are insulated and are fitted with a cooling compressor (not shown) to maintain the liquid beverages stored therein at a low temperature. The insulated, refrigerated cabinet 10 and the cooling compressor will likewise retain the milk stored in readily available five gallon chocolate milk bags (not shown), available in boxes 12, at a temperature sufficiently low to prevent the milk from spoiling. The milk, or other beverage, is only heated after it enters a hot beverage housing 40, in fluid communication with a hot beverage dispensing spigot 11. The beverage is only heated when the spigot 11 is being actively used to dispense a hot beverage, such as chocolate milk, and is therefore dispensed fresh. An upper surface 14 of the refrigerated cabinet 10 preferably is made of stainless steel and has one or more drip trays 16 to allow excess hot beverage that falls upon the surface 14 to drain from the drip trays 16 into a waste container (not shown) preferably positioned within the cabinet 10.

In accordance with one important embodiment, the refrigerated cabinet 10 includes a plurality of wheels 18 for rolling the refrigerated cabinet 10 across a hard surface, such as a concrete floor. A power line 19 extends from an opening in cabinet 10 and includes an electrical connector 22 suitable for attachment to a 110 volt-power outlet 24 for supplying electric power to the electrical elements within the refrigerated cabinet 10. Positioned adjacent the refrigerated cabinet 10 is a pressurized gas, e.g., $CO_2$ or $N_2$ tank 26 that is secured, e.g., by a strap 28 to a side of the refrigerated cabinet 10. The $CO_2$ tank 26 includes a valve 29 that is operatively connected to a pressure regulator 30 for controlling the pressure of gas released from tank 26 to a supply line 32 and from supply line 32 to a dispensing pump 34. The dispensing pump 34 preferably is operated by $CO_2$ that hydraulically operates a piston (not shown) inside the dispensing pump 34. Dispensing pump 34 draws the milk out of bags (not shown) inside boxes 12. Preferably, multiple boxes 12 are connected in series, e.g., five bags being dispensed at once, as shown in FIG. 1. Cold milk supply conduits 35 are attached to the cold milk bags with fittings 36 and the supply conduits 35 are connected together at connectors 42 to form a single supply conduit 42A that feeds cold milk into the pump 34. Pump 34 pumps the cold milk out of the refrigerated dispenser 10 through conduit 35 and into the hot beverage housing 40 for heating.

The hot beverage housing 40 is insulated from the refrigerated cabinet 10 such as by spacing the hot beverage housing 40 above the refrigerated cabinet 10, as shown in FIG. 1.

Figure 2:
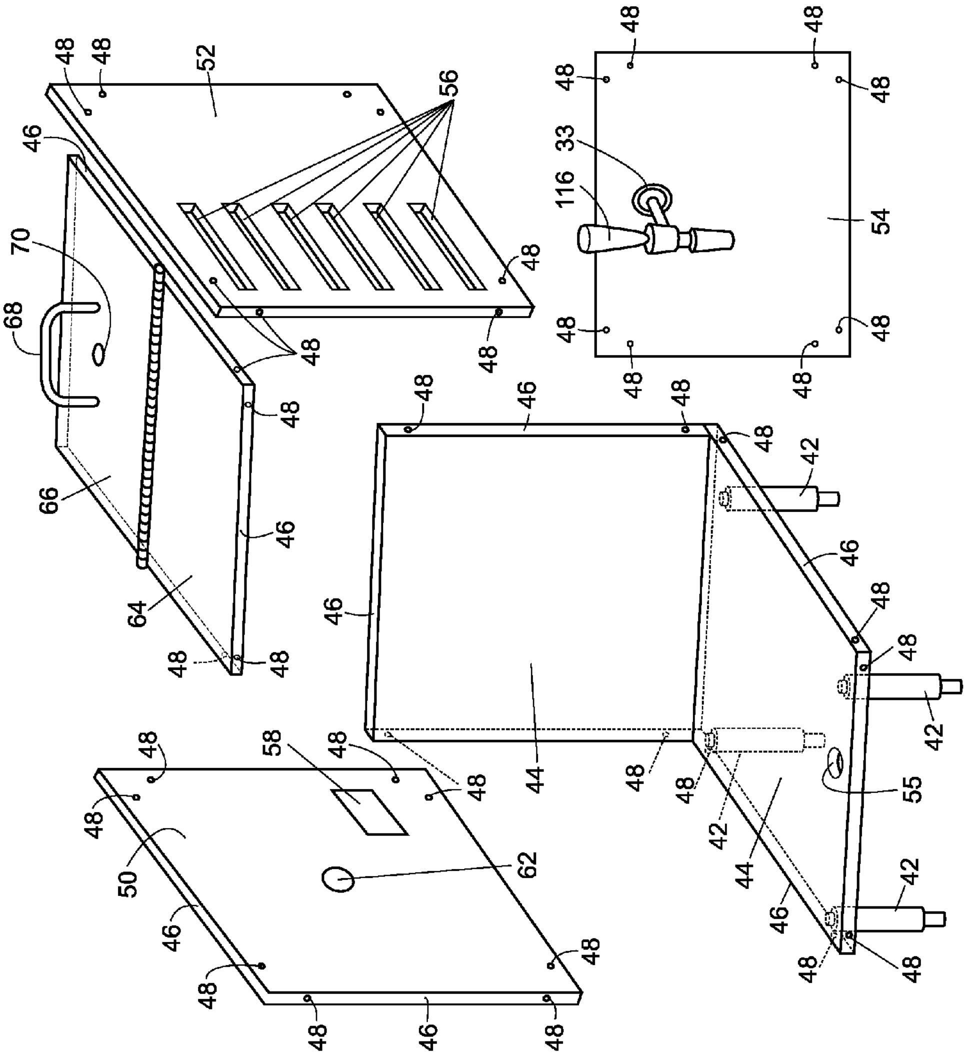
FIG. 2 is an exploded isometric view of the outer housing of the hot beverage housing portion of the dispensing device shown in FIG. 1.

Referring to FIGS. 1 and 2, the hot beverage housing 40 preferably is constructed of 304 stainless steel, 16 gauge with four adjustable spacing legs 42. In a preferred embodiment, a base and back wall 44 are formed from a single sheet of stainless steel, and include right angle flange portions 46 and screw holes 48 for attaching hot beverage housing 40 side panels 50 and 52 and front panel 54 thereto. The base 44 has an opening 55 for the refrigerated milk to enter into the hot beverage housing 40. Right side panel, 52 includes openings or vents 56 to prevent a heat exchange fluid circulating pump 112 from overheating. Side panels 50 and 52 also have flanges 46 and screw holes 48 for attachment to adjacent base and back walls 44 and front and top panels 54 and 64, respectively, in forming the hot beverage housing 40. The left side panel 50 has an aperture, or knockout 58 for receiving and servicing a heating element 60 (FIG. 4), and a second aperture 62 that receives electrical wiring. In a preferred embodiment, the top panel 64 of the hot beverage housing 40 includes a hinged door 66 having a handle 68, so that the door 66 can be lifted, and a vent hole 28 to relieve any pressure that is built up during heating of a hot transfer fluid, e.g., propylene glycol. Top panel 64, 66 also includes flanges 46 for connecting to the base, front and side panels 44, 54, 50 and 52, as shown in FIG. 2.

Figure 3:
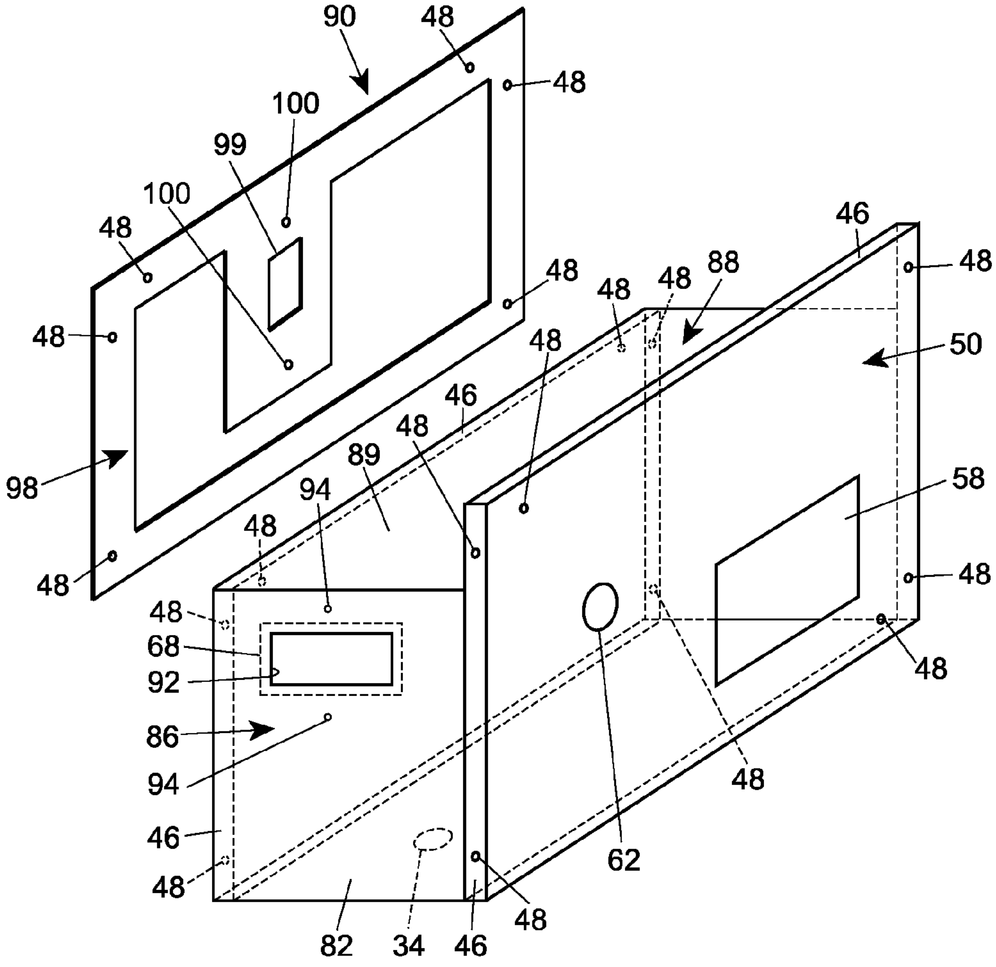
FIG. 3 is an exploded isometric view of the electrical side cabinet of the dispensing device where the electrical system is stored, shown as an integrally attached part of the hot beverage housing in FIG. 1.

As shown in FIGS. 1 and 3, the hot beverage housing 40 is integrally connected to an adjacent, electrical side cabinet 80 that houses all electrical controls and wiring that control the thermostat, circulating pump, and heating element. As shown in FIG. 3, electrical side cabinet 80 is formed by side panel 50 of the hot beverage housing 40, bottom panel 82 having an aperture or knockout 84 to receive wiring, front and rear panels 86 and 88, top panel 89, and cover plate 90, shown detached in FIG. 3. Bottom, front and rear panels 82, 86 and 88, respectively, and cover plate 90 are interconnected by flanges and screw holes 46 and 48, respectively, in the same manner as described above for the hot beverage housing 40. The bottom panel 82, front and rear panels 86 and 88, and top panel 89, advantageously are formed from a single sheet of stainless steel that is stamped, folded and welded, and then connected to the lid, 90.

Cover plate 90 is easily removed from the electrical side cabinet 80 by removing screws from screw holes 48, for electrical service and assembly. Front panel 86 includes an aperture, or knockout 92 and screw holes for mounting a thermostat 93 inside of the electrical side cabinet 80. An electrical power line 94 (FIG. 1) passes through an aperture 96 in the refrigerated cabinet 10 and electrically connects to the electrical side cabinet 80 at electrical connector 97, and aperture 84 in the bottom panel 82 of the electrical side cabinet 80 to power the electrical components in electrical side cabinet 80. Cover plate 90 includes an edge gasket 98 to keep moisture out of the electrical side cabinet. Aperture 99 in cover plate 90 receives an on/off switch 138 (FIG. 5) that is mounted in screw holes. Preferably, all apertures in the electrical side cabinet 80 are sealed by gasket or other sealing material to prevent moisture from entering the electrical side cabinet 80.

Figure 4:
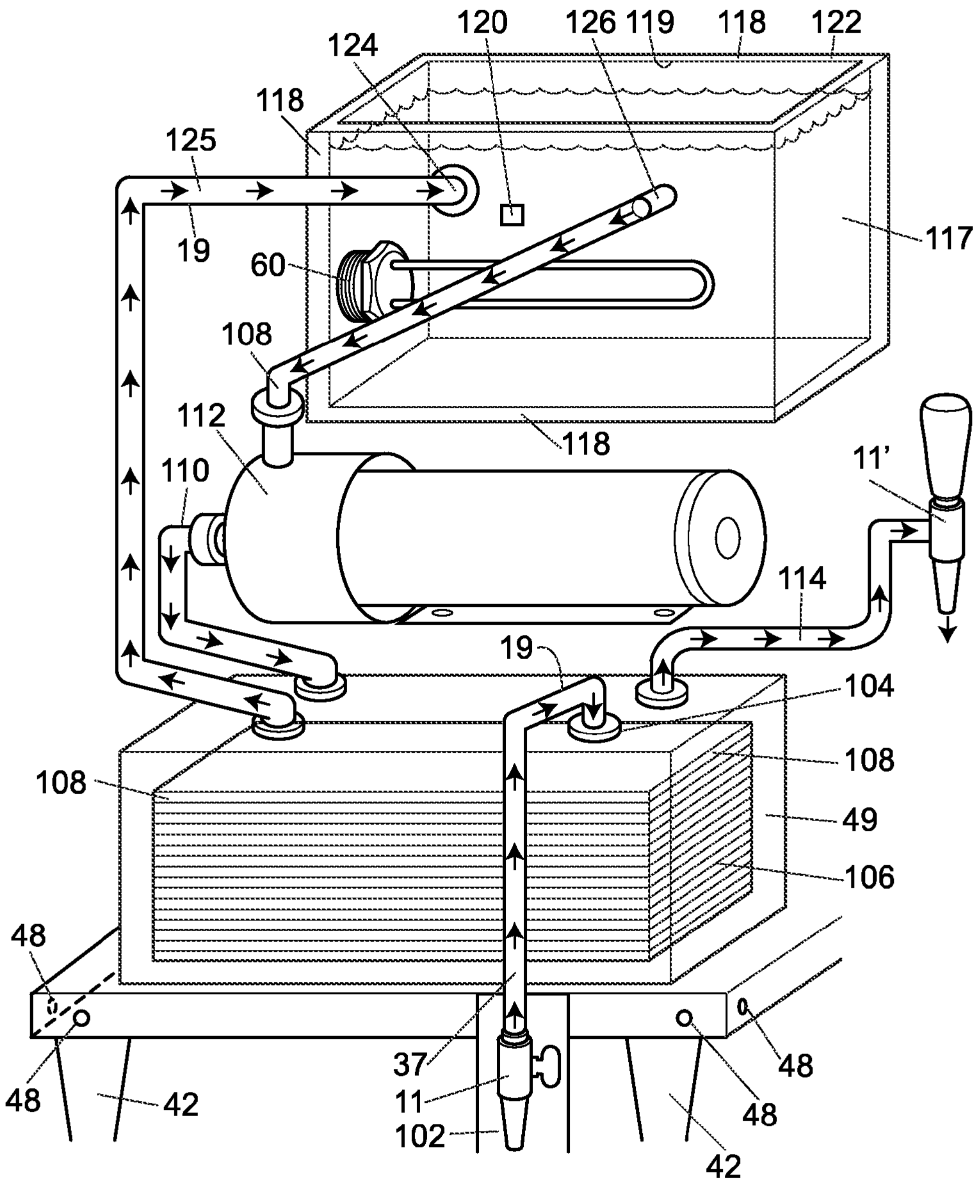
FIG. 4 is an enlarged, exploded isometric view of the inner components of the hot beverage housing shown in FIG. 2.

Referring to FIGS. 1 and 4, milk is pumped from the refrigerated cabinet 10 via pump 34, through insulated conduit 37 into the hot beverage housing 40 for controlled heating. Conduit 37 is surrounded by an insulated jacket 102 to ensure proper beverage temperature entering the hot beverage housing 40 before the milk is heated. The cold milk supply conduit 37 is attached to a quick-disconnect fitting 104 so the hot beverage housing 40 can be easily removed for cleaning when not in use.

As shown in FIG. 4, cold milk enters the hot beverage housing 40 from cold milk supply conduit 37 and enters a flat plate heat exchanger 106 where the milk enters a plurality of planar, adjacent plates that are heated by a hot heat exchange fluid, e.g., liquid or propylene glycol, that never comes in direct contact with the milk. As shown in FIG. 4, milk in insulated cold milk supply conduit 37 enters a first planar plate 108, and hot heat exchange fluid enters an adjacent planar plate 109 through hot fluid conduits 108, 110 and heat exchange fluid circulating pump 112. The milk is heated to a precise, controlled temperature, e.g., 165° F., as it passes against the alternating heated glycol plates 109 and leaves through another insulated conduit 114 in fluid communication with the dispensing spigot 11 and is ready to be served. The heat exchange fluid, e.g., glycol, is stored in a holding tank 117 within the hot beverage housing 40. The holding tank 117 is insulated with insulation 118 to retain the heat that is generated by heating element 60 that is screwed into a side of the heat exchange liquid holding tank 117. The heating element 60 is controlled by thermostat 93 with a temperature probe 120 attached to the tank 117. Tank 117 has a flange 122 at a top opening 119 for tight closing of top panel 64 and hinged door 66 (FIG. 1). On one side of the tank 117 there are two ports 124 and 126 for attachment to heat exchange fluid supply conduit 108 and heat exchange liquid return conduit 125. Heat exchange fluid supply conduit 108 is connected to heat exchange fluid circulating pump 112 for supplying heated glycol to the flat plate heat exchanger 106 through supplying conduit 110, and heat exchange fluid return conduit 125 delivers glycol from the flat plate heat exchanger 106 to the liquid holding tank 117 for further heating. Circulating pump 112 pumps the heated liquid, e.g., propylene glycol through the flat plate heat exchanger 106 to heat the milk as it passes through alternating alternating 108 in an opposite direction to that of the hot heat exchange fluid flowing through front plates 109. When the heated glycol leaves the heat exchanger 106, it returns through the return conduit 125 back to port 124 at an upper portion of the holding tank 117, creating a continuous cycle of heat being generated in the flat plate heat exchanger 106.

Figure 5:
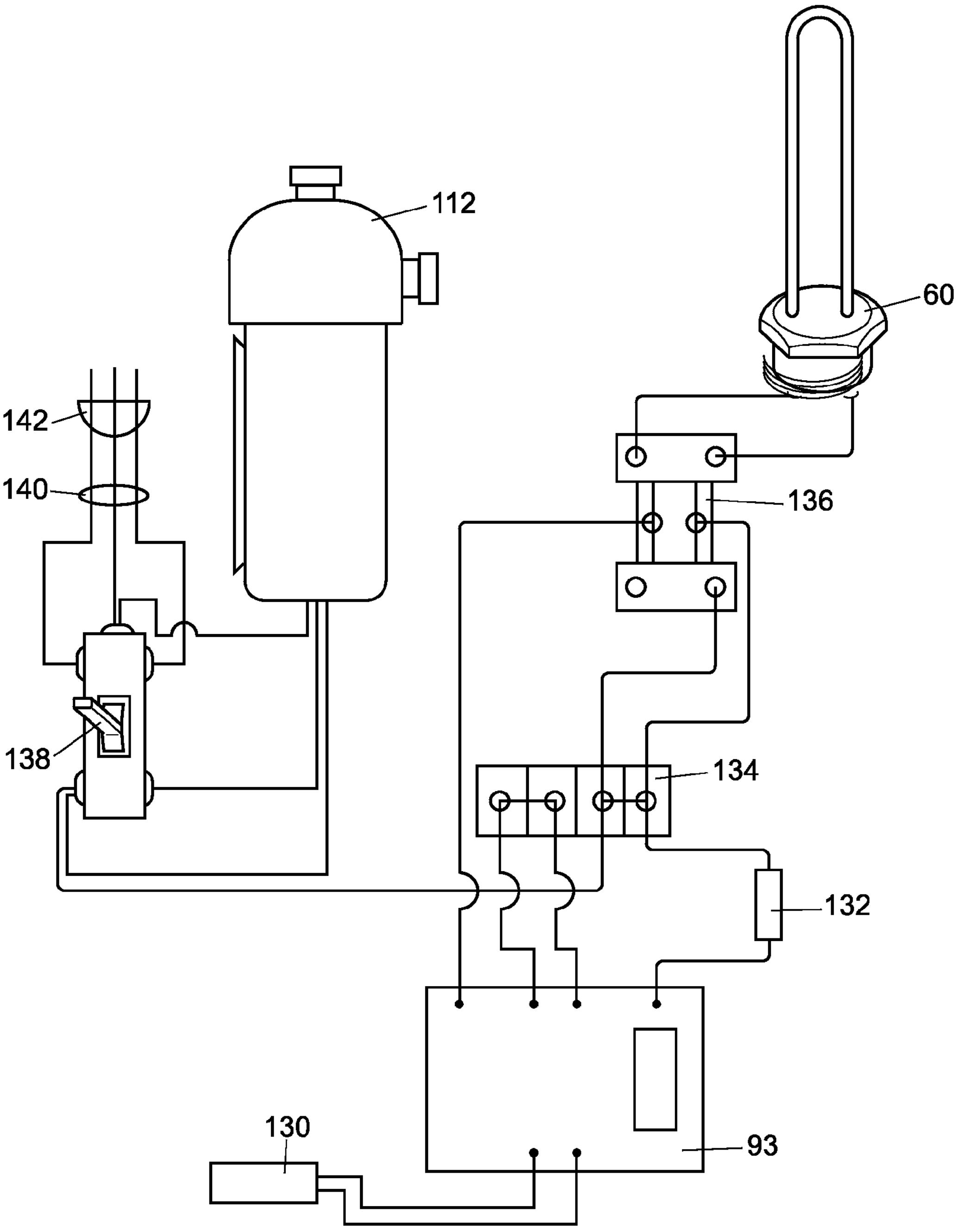
FIG. 5 is a schematic drawing of the electrical components of the electrical side cabinet shown in FIG. 3, for controlling the heating of the beverage within the hot beverage housing.

Referring to FIG. 5 the thermostat 93 is a 208-240 VAC 50/60 Hz supply heating mode thermostat with a permanently preset control point at +170° F. that has a temperature probe 130 that is attached to the heat exchange fluid holding tank 117. The thermostat 93 has an inline fuse 132 to protect against power surges coming from a terminal block 134 from a relay switch (40 amp 240 ov max) 136 which sends power to the heating element 60 from the on/off switch 138 (30 a, 120-277 v). The on/off switch 138, when turned on, runs power to the circulating pump 112. The on/off switch 138 includes a #10 gauge waterproof cable 64 having a 30 a 208-240 v plug 142 attached thereto.

Figure 6:
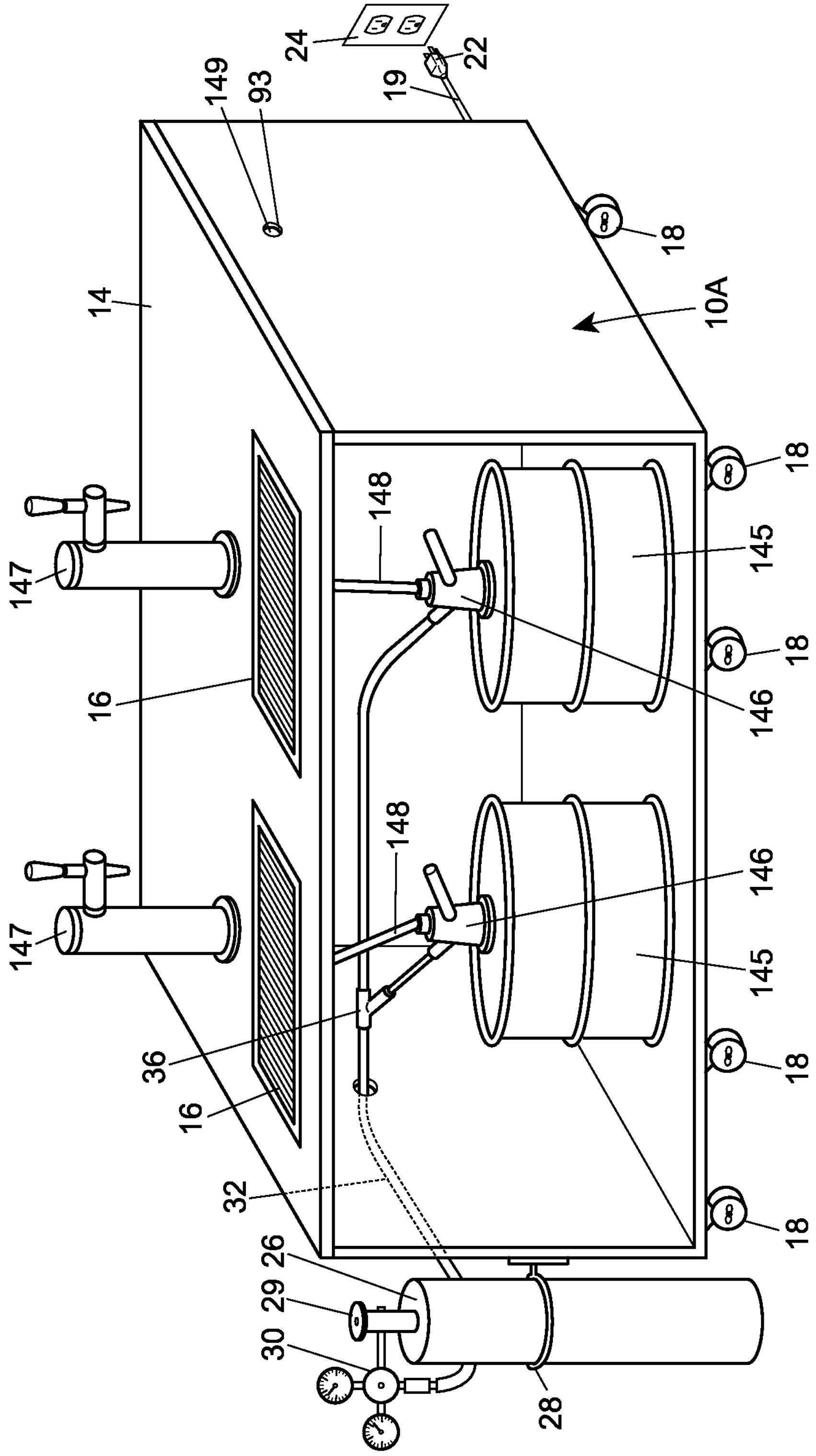
FIG. 6 is an isometric view of a typical system for dispensing draft beer with the elements of the system visible.

Referring to FIG. 6, the refrigerated cabinet 10 can be obtained and converted from a draft beer dispenser that includes a refrigerated cabinet 10A having a compressor (not shown) that runs on a 120V 15 amp electrical supply that maintains a cold temperature for the beer 145 to be dispensed, and is therefore suitable for retro-fitting with hot beverage housing 40, containing a flat plate heat exchanger for dispensing hot chocolate milk. The retro-fitted draft beer dispenser can then be re-converted to its original form to dispense draft beer once again, or to dispense both draft beer and hot beverages from different spigots. To convert the beer dispenser to a hot chocolate milk dispenser, first disconnect and remove keg coupler fittings 146 and remove beer kegs 145. Next, unscrew and remove beer dispensing heads 147 and supply lines 148. Next, remove knock-out plug 149 exposing hole 96 for passage of electrical cord 94 (FIG. 1). With beer dispensing heads 147 removed, two holes are exposed in the counter top 14. Cover one hole with a stainless cap and then set the hot beverage housing 40 (FIG. 1) over the second hole. Attach beverage pump 34 to the top of the cabinet 10. Attach the $CO_2$ supply line 32 to beverage pump 34. Attach chocolate milk supply conduits 35 to one end of line 42A and attach the other end of supply conduit 42A to pump 34. Attach one end of supply conduit 37 to pump 34 and the other end of supply conduit 37 to the hot beverage housing 117. Run electrical cord 94 to outlet 150 (FIG. 1). Install chocolate milk boxes 12 containing chocolate milk bags (not shown). Connect free ends of supply conduit 35 to chocolate milk bags in boxes 12. Open the $CO_2$ supply valve 29. Turn on power switch 138 (FIG. 1) to power on the hot beverage dispenser. The device is now ready to dispense hot chocolate milk. Use regulator 30 to set the desired flow rate (up to 6-16 ounce cups per minute). To convert a refrigerated draft beer dispensing system to a hot chocolate milk dispensing system takes a trained operator about one hour and a similar amount of time to convert it back to a draft beer dispensing system. If desired, separate supply conduits and spigots can be used for draft beer and hot chocolate milk so that a single portable cart can supply both.

In still another preferred embodiment, the portable hot liquid dispensing device of the instant invention is used to dispense hot alcoholic beverages such as hot spiced wine.

In this embodiment, a serried of metal pressure tanks are connected by hoses and fittings in series with the first in the series connected by supply line to the portable hot dispensing device of the instant invention and the last in the series connected to a source of pressurized nitrogen gas.

While the present invention has been described with respect to a single embodiment. It would be appreciated that many modifications and variations may be made without departing from the spirit and scope of the invention. It is therefore the intent of the appended claims to cover all such modifications and variations that fall within the spirit and scope of the invention.

What is claimed:

1. A hot beverage dispensing device for heating and dispensing a beverage comprising a cabinet having a beverage storage area for storing a beverage to be heated;

a hot beverage housing that is insulated from or separated from the beverage storage area;

a flat plate heat exchanger disposed in the hot beverage housing;

a heat exchange fluid reservoir for retaining and heating a heat exchange fluid;

a heating element disposed within the heat exchange fluid reservoir for contact with and heating the heat exchange fluid to a desired temperature;

a heat exchange fluid pump for circulating heated heat exchange fluid into the flat plate heat exchanger and from the flat plate heat exchanger back to the heat exchange fluid reservoir for further heating;

a beverage pump for pumping beverage from the beverage storage area of said cabinet into the flat plate heat exchanger in the hot beverage housing, and for pumping heated beverage from the flat plate heat exchanger to a dispensing spigot; and a dispensing spigot in fluid communication with heated beverage that exits the flat plate heat exchanger.

2. The device of claim 1, further including means for refrigerating the beverage storage area.

3. The device of claim 1 and further comprising a thermostat for monitoring a temperature of said heat exchange fluid; a power regulator for applying power to said heating element, when said thermostat detects a heat exchange fluid temperature below a preset temperature and for terminating power to said heating element when said thermostat detects a temperature equal to or above said preset temperature.

4. The device of claim 1, wherein the beverage is selected from the group consisting of milk, apple cider, and spiced wine.

5. The device of claim 1, wherein said heat exchange fluid is a glycol.

6. The device of claim 5, wherein the glycol is propylene glycol.

7. The device of claim 1, wherein said beverage pump is hydraulically operated by a pressurized gas supply.

8. The device of claim 7, wherein the pressurized gas is $CO_2$ or $N_2$.

9. The device of claim 1, further including wheels extending from the cabinet so that the device is portable.

10. A method of heating and dispensing a beverage comprising:

storing a beverage to be heated in a beverage storage area of a refrigerated cabinet;

pumping the beverage from the beverage storage area into a flat plate heat exchanger for heating the beverage to a desired temperature;

heating a heat exchange fluid to a desired temperature in a heat exchange fluid reservoir to form a heated heat exchange fluid;

circulating the heated heat exchange fluid into the flat plate heat exchanger, in a direction countercurrent to a flow of beverage, for heat transfer from the heated heat exchange fluid to the flat plates of the flat plate heat exchanger and from the heated plates to the beverage, thereby heating the beverage to the desired temperature; and pumping the heated beverage out of a spigot, said spigot being in fluid communication with heated beverage exiting the flat plate heat exchanger.

11. The method of claim 10, wherein the beverage is pumped from the beverage storage area of the refrigerated cabinet to the flat plat heat exchanger and the heated beverage is pumped from the flat plate heat exchanger to the spigot by a pressurized gas that operates a beverage pump.

12. The method of claim 11, wherein the pressurized gas is $CO_2$ or $N_2$.

13. The method of claim 10, further including the step of monitoring and controlling a temperature of the heat exchange fluid entering the flat plate heat exchanger in order to achieve a desired heated beverage temperature exiting the flat plate heat exchanger.

14. The method of claim 10, wherein the beverage is selected from the group consisting of milk, apple cider, and spiced wine.

15. The method of claim 10, wherein the heat exchange fluid is selected from the group consisting of ethylene glycol, propylene glycol, and mixtures thereof.

16. A method of serving a heated beverage from a portable hot liquid dispensing device at multiple locations in an entertainment venue comprising:

connecting the hot liquid dispensing device to a supply of electricity at a first location;

storing a beverage to be heated in a beverage storage area of a wheeled cabinet;

pumping the beverage from the beverage storage area into a flat plate heat exchanger for heating the beverage to a desired temperature;

heating a heat exchange fluid to a desired temperature in a heat exchange fluid reservoir to form a heated heat exchange fluid;

circulating the heated heat exchange fluid through the flat plate heat exchanger, in a direction countercurrent to a flow of beverage, for heat transfer from the heated heat exchange fluid to the flat plates of the flat plate heat exchanger and from the heated plates to the beverage, thereby heating the beverage to the desired temperature;

pumping the heated beverage out of a spigot, said spigot being in fluid communication with heated beverage exiting the flat plate heat exchanger; thereby serving a customer with a hot beverage at a first location;

wheeling the refrigerated cabinet to a second location and connecting the hot liquid dispensing device to a supply of electricity at a second location; and repeating the heating and serving steps at said second location.

17. The method of claim 16, wherein the beverage is pumped from the beverage storage area of the refrigerated cabinet to the flat plat heat exchanger and the heated beverage is pumped from the flat plate heat exchanger to the spigot by a pressurized gas that operates a beverage pump.

18. The method of claim 17, wherein the pressurized gas is $CO_2$ or $N_2$.

19. The method of claim 16, further including the step of monitoring and controlling a temperature of the heat exchange fluid entering the flat plate heat exchanger in order to achieve a desired heated beverage temperature exiting the flat plate heat exchanger.

20. The method of claim 16, wherein the beverage is selected from the group consisting of milk, apple cider, and spiced wine.

* * * * *